(12) United States Patent
Duret et al.

(10) Patent No.: US 11,357,601 B2
(45) Date of Patent: Jun. 14, 2022

(54) ELECTRONIC IMPRESSION TRAY FOR OBTAINING DENTAL INFORMATION

(71) Applicants: Francois Duret, Fleury d'Aude (FR); Guy De Vreese, Ghent (BE)

(72) Inventors: Francois Duret, Fleury d'Aude (FR); Guy De Vreese, Ghent (BE); Veronique Querbes-Duret, Esqualquens (FR)

(73) Assignees: Francois Duret, Fleury d'Aude (FR); Guy De Vreese, Ghent (BE)

( * ) Notice: Subject to any disclaimer, the term of this patent is extended or adjusted under 35 U.S.C. 154(b) by 0 days.

(21) Appl. No.: 16/965,958

(22) PCT Filed: Jan. 29, 2019

(86) PCT No.: PCT/FR2019/050184
§ 371 (c)(1),
(2) Date: Jul. 29, 2020

(87) PCT Pub. No.: WO2019/145658
PCT Pub. Date: Aug. 1, 2019

(65) Prior Publication Data
US 2021/0045851 A1    Feb. 18, 2021

(30) Foreign Application Priority Data

Jan. 29, 2018    (FR) ..................... 18 50689

(51) Int. Cl.
*A61C 9/00* (2006.01)
*A61C 17/08* (2006.01)
*A61C 17/02* (2006.01)

(52) U.S. Cl.
CPC .......... *A61C 9/0006* (2013.01); *A61C 9/0053* (2013.01); *A61C 17/0208* (2013.01); *A61C 17/08* (2019.05)

(58) Field of Classification Search
CPC ..... A61C 9/0006; A61C 17/08; A61C 9/0053; A61C 17/0208
See application file for complete search history.

(56) References Cited

U.S. PATENT DOCUMENTS

| 4,324,546 A | * | 4/1982 | Heitlinger | .......... A61C 13/0004 433/25 |
| 5,316,473 A | * | 5/1994 | Hare | .................... A61C 19/004 433/215 |

(Continued)

FOREIGN PATENT DOCUMENTS

| EP | 0040165 A1 | 11/1981 |
| EP | 0091876 A1 | 10/1983 |
| WO | 2011154656 A1 | 12/2011 |

*Primary Examiner* — Nicholas D Lucchesi
(74) *Attorney, Agent, or Firm* — Craft Chu PLLC; Andrew W. Chu (57) ABSTRACT

An electronic impression tray can be used to obtain three-dimensional and temporal measurements in dentistry. There is a device having optical measurement sensor system, and an electronic system including a central management unit capable of collecting, storing and ordering the data obtained by the sensor systems distributed over all or part of the impression tray. An optical impression of all or part of a dental arch can be obtained with a single or multiple impressions. The tray includes a part having the shape of all or part of a dental arch, and the part can change by virtue of its ability to deform and/or a structure formed by multiple elements that are hinged to one another and/or reversibly assembled and secured to one another, such as to provide the optimal shape.

16 Claims, 10 Drawing Sheets

(56) References Cited

U.S. PATENT DOCUMENTS

| | | | | |
|---|---|---|---|---|
| 5,487,662 | A * | 1/1996 | Kipke | A61C 9/0006 |
| | | | | 433/215 |
| 6,386,867 | B1 * | 5/2002 | Durbin | A61C 9/00 |
| | | | | 433/214 |
| 6,976,841 | B1 * | 12/2005 | Osterwalder | A61C 19/063 |
| | | | | 433/29 |
| 7,156,656 | B2 * | 1/2007 | Duret | A61C 19/066 |
| | | | | 433/215 |
| 9,131,909 | B1 * | 9/2015 | Ganz | A61B 6/04 |
| 9,763,760 | B2 * | 9/2017 | Senn | G01N 21/55 |
| 9,974,630 | B2 * | 5/2018 | Heacock | A61C 19/066 |
| 10,470,847 | B2 * | 11/2019 | Shanjani | H04B 5/0056 |
| 10,504,386 | B2 * | 12/2019 | Levin | G09B 23/283 |
| 10,542,946 | B2 * | 1/2020 | Martin | A61B 1/05 |
| 2002/0064752 | A1 | 5/2002 | Durbin et al. | |
| 2009/0081611 | A1 * | 3/2009 | Hines | A61C 17/14 |
| | | | | 433/140 |
| 2012/0064477 | A1 * | 3/2012 | Schmitt | A61B 6/145 |
| | | | | 433/29 |
| 2014/0277665 | A1 * | 9/2014 | Fisker | G06F 30/00 |
| | | | | 700/98 |
| 2015/0079534 | A1 | 3/2015 | Tsuji et al. | |
| 2015/0118638 | A1 | 4/2015 | Cowburn | |
| 2015/0164618 | A1 * | 6/2015 | Heacock | A61C 7/08 |
| | | | | 433/6 |
| 2016/0242692 | A1 * | 8/2016 | McAuliffe | G06F 30/00 |
| 2016/0262856 | A1 * | 9/2016 | Atiya | A61B 1/015 |
| 2017/0100219 | A1 | 4/2017 | Schmitt | |
| 2017/0128173 | A1 | 5/2017 | Berner et al. | |
| 2017/0215997 | A1 * | 8/2017 | Martin | A61B 1/05 |
| 2019/0365237 | A1 * | 12/2019 | Lee | A61B 1/00045 |
| 2021/0127979 | A1 * | 5/2021 | Binkowski | A61B 5/0088 |

\* cited by examiner

ELECTRONIC IMPRESSION TRAY FOR OBTAINING DENTAL INFORMATION

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to an electronic impression system for obtaining a three-dimensional view of all or part of a dental arch, for obtaining dental information.

The object of the present invention is more particularly to propose an electronic impression tray usable for obtaining three-dimensional and temporal measurements in dentistry, and which consists of a device comprising optical measurement sensor systems, possibly associated with ultrasonic sensors and/or OCT (coherent tomographic optics), an electronic system which includes a central management unit capable of collecting, storing and ordering the data obtained by said sensors, the said sensors being distributed over all or part of said impression tray so as to allow an optical impression to be obtained with a single or multiple impressions.

2. Description of Related Art Including Information Disclosed Under 37 CFR 1.97 and 37 CFR 1.98

The present inventor has already proposed means of carrying out diagnostics and dental prostheses using optical or ultrasonic measurements in the mouth of a patient, and which, in combination with computer means, make it possible to design and follow the different stages of the clinical act, to lead to the production of prostheses on a machine or by communicating with colleagues for a diagnostic search.

His numerous works have led him to the realization of numerous inventions described in patents such as, in particular but not limited to, EP0040165 and EP0091876, relating to obtaining an impression by optical means, then more recently in a new patent WO2011154656.

If these documents actually correspond to the needs of modern dentistry, in particular as described in the document WO2011154656, it turns out that in use, the implementation of these inventions required additional research to facilitate their operation.

Furthermore, documents are known in which other solutions are proposed.

This is the case, for example, of document US2017100219, which proposes an impression tray comprising sensor means capable of obtaining an impression of at least part of a tooth or of a set of teeth, said sensor means being associated with a molding material, usually used for obtaining impressions, so that such a tray cannot be satisfactory.

We also know from document US2015118638, an impression tray consisting of a tray or a chute, and equipped with sensor means making it possible to obtain images which, combined, are intended to determine the depth of sulcus in an edentulous individual with a view to its fitting. Such an impression tray does not allow the capture of dental information.

Also known, from document US2017128173, a scanning device comprising a handle intended to be held by an operator and a mouthpiece comprising a 3D scanner as well as means for moving said 3D scanner inside said mouthpiece. If such a device can be considered as simple use, its use has limits. Indeed, whatever the movement possibilities of the 3D scanner inside the mouthpiece, not all surfaces can be reached with the same precision, if they can be reached.

BRIEF SUMMARY OF THE INVENTION

It turns out that the knowledge of bone contours, associated with the optical impression, requires complex manipulations and significant knowledge, which has led to the need to design a global impression system to respond to specifications.

According to these specifications, the electronic impression tray must, first of all, be easy to use for the practitioner and its placement in the mouth must be spontaneous, short and rapid. For the patient it should not be traumatic.

In particular, its shape must be adapted to the different arch shapes or, again, the lights used must not dazzle selected sensors because they are particularly reduced in volume.

As the area to be measured is limited by the cheeks and the gum, the number of sensors must be high enough so that the target surface is completely covered by the reading. The size must also be reduced to its strictest minimum and this immediately eliminates any system using the projection of structured light. Passive systems such as stereoscopy and OCT must therefore be used or systems using very reduced or merged transmitters and sensors as in ultrasound.

It is also necessary to give the possibility of potentiating the optical impression in the mouth, which remains a penalizing act for the patient, by collecting at the same time, or in very close time, the shape of the dental surfaces and their shades, the gingival surfaces, the movements of the arches relative to one another and even, if time permits, the bone contours.

The object of the present invention is to meet all these needs, at a lower cost, by satisfying the patient by its comfort and speed, but also without requiring the practitioner to have too complex or too long training, while keeping a reasonable investment.

Thus, the electronic impression tray according to the invention can be used for obtaining three-dimensional and temporal measurements in dentistry, it consists of a device comprising optical measurement sensor systems, an electronic system which comprises a central management unit capable of collecting, storing and ordering the data obtained by said sensors, the said sensors being distributed over all or part of said impression tray so as to allow an optical impression of all or part of a dental arch to be obtained with a single or multiple impressions, and it is characterized in that it consists of a part having the shape of all or part of a dental arch, and having a design that can change by virtue of its ability to deform and/or a structure formed by multiple elements that are hinged to one another and/or reversibly assembled and secured to one another, such as to provide the optimal shape.

According to an additional characteristic of the electronic impression tray according to the invention, the optical measurement sensors are associated with ultrasonic and/or OCT (coherent tomographic optics) sensors.

According to another additional characteristic of the electronic impression tray, according to the invention, it is made of a deformable material such as a thermoplastic material or a flexible resin, not returning to the original shape after adaptation in the mouth of the patient.

According to another additional characteristic of the electronic impression tray according to the invention, its active part, equipped with sensors, has a shape adapted or adaptable by deformation, to the particularities of the occlusion.

According to another additional characteristic of the electronic carrier according to the invention, it is made of at least two integral elements, each suitable for obtaining an impression of at least part of an arch, and in that said at least two elements are configured so that sensors of at least one of them associate with sensors of another element, so that the optical impression of at least part of the arch is produced with sensors of said at least two elements.

According to another additional characteristic of the electronic impression tray according to the invention, the at least two interlockable elements are shaped to be joined, reversibly, by interlocking.

According to another additional characteristic of the electronic impression tray according to the invention, the at least two interlockable elements are shaped to be joined magnetically.

According to another additional characteristic of the electronic impression tray according to the invention, it comprises means for adjusting the depth consisting of means for taking support on the teeth.

According to another additional characteristic of the electronic impression tray according to the invention, the support means on the teeth consist of at least one blade, rod or the like, projecting between the sensors.

According to another additional characteristic of the electronic impression tray according to the invention, the means for taking support on the teeth consist of at least one transparent wall, extending above the sensors.

According to another additional characteristic of the electronic impression tray according to the invention, the transparent wall has marks.

According to another additional characteristic of the electronic impression tray according to the invention, the transparent wall is deformable.

According to another additional characteristic of the electronic impression tray according to the invention, the transparent wall is associated in sliding contact with another transparent wall, which cooperates with means, motorized or not, capable of generating a friction movement between said transparent walls.

According to another additional characteristic of the electronic impression tray according to the invention, it comprises a peripheral and/or central suction system, and/or a water and/or air jet system.

According to another additional characteristic of the electronic impression tray according to the invention, it comprises means for projecting passive light, unstructured, to illuminate the interior of the mouth.

According to another additional characteristic of the electronic impression tray according to the invention, it is black in color so as not to hinder the obtaining of information.

According to another additional characteristic of the electronic impression tray according to the invention, its part comprising the sensors is separated from the rest of the impression tray and connected to the latter through wired means or a wireless communication system.

BRIEF DESCRIPTION OF THE SEVERAL VIEWS OF THE DRAWINGS

The advantages and characteristics of the electronic impression tray according to the invention, will emerge more clearly from the description which follows and which relates to the appended drawings, which represent several non-limiting embodiments.

In the accompanying drawings:

FIG. 7b shows a schematic sectional view of FIG. 7a.

FIG. 8b shows a schematic sectional view of FIG. 8a.

DETAILED DESCRIPTION OF THE INVENTION

The present invention consists of an electronic impression device comprising cameras and light projection means, intended to be arranged facing a dental arch of a patient or part of an arch of a patient.

With reference to FIGS. 1a, 1b, 1c and 1d, different types of the electronic impression device 1 according to the invention can be seen, which comprises an optical measurement sensor system Cl being comprised of a plurality of sensors C, an electronic management system X (See FIG. 20) in communication with the sensors C and being comprised of a central management unit X1 so as to collect, store, and order data obtained by the sensors C (See FIG. 20), and a tray 2 having a dental arch part 21. The sensors C are arranged on the dental arch part 21 of the tray 2, whereby the different types of impression devices 1 shown in these figures each allow the electronic impression of a defined part of a dental arch of the patient to be obtained by the dental arch part 21 of the tray 2.

The tray 2 essentially has two parts, one part 20 constituting a handle for gripping by the practitioner, and the dental arch part 21, which comprises the sensors C.

The present invention includes an impression device 1 having cameras and light projection means, intended to be arranged facing a dental arch or part of an arch of the patient.

Figure 1A:
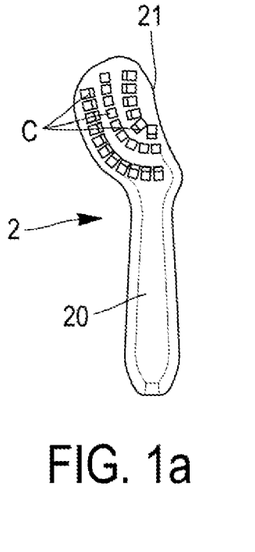
FIGS. 1a, 1b, 1c and 1d show schematic plan views of different embodiments of an electronic impression tray according to the invention.

With reference to FIGS. 1a, 1 b, 1c and 1d, different types of electronic impression devices 1 according to the invention can be seen, which comprise a tray 2 equipped with series of optical measurement sensors C, arranged according to the intended use of the impression tray, whereby the different types of impression device 1 shown in these figures each allow the impression of a defined part of a dental arch to be obtained.

The tray 2 essentially has two parts, one part 20 constituting a handle for gripping by the practitioner, and one dental arch part 21, which has the sensors C. The tray 2 can be comprised of a plurality of elements 34, 24, 25, 26, 27, 28 in hinged engagement with each other so as to reversibly form the dental arch part 21.

Figure 1B:
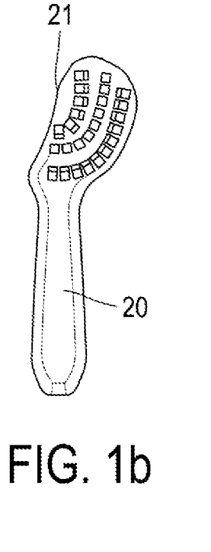
Figure 1C:
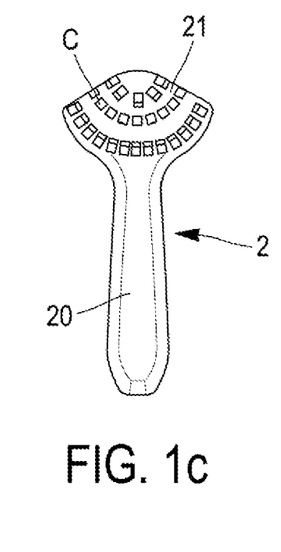
Figure 1D:
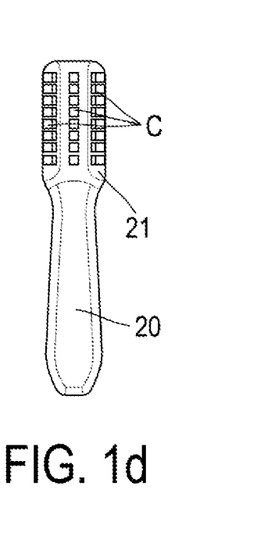

Thus, FIGS. 1a and 1b show impression devices 1 intended for the impression of a semi-arch, and FIGS. 1c and 1d of impression devices 1 for obtaining the impression of part of an arch.

It will be noted that the dental arch part 21 preferably comprises means for projecting passive, unstructured light 4 (See FIG. 18) produced by simple light emitting diodes (LEDs) 41 (See FIG. 18) or laser or halogen for simply lighting the interior of the mouth but not serving as a measurement vector.

Figure 2A:
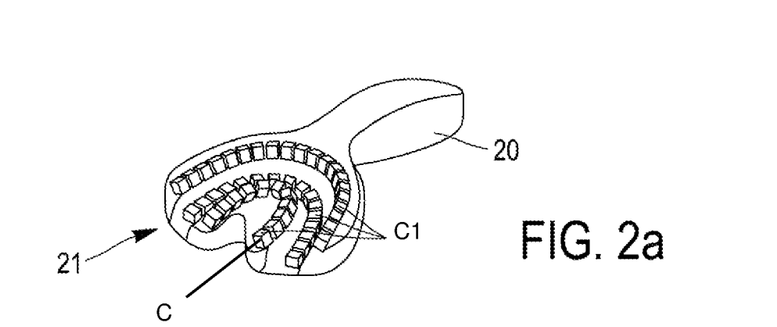
FIGS. 2a, 2b and 2c show schematic perspective views of another embodiment of the electronic tray according to the invention in different configurations of use.
Figure 2B:
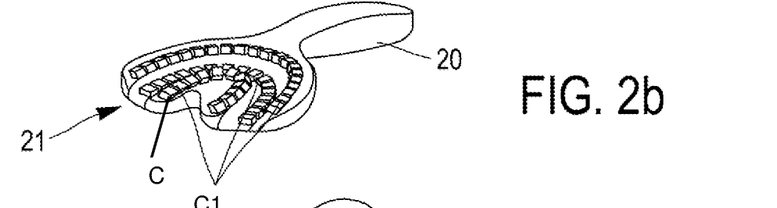
Figure 2C:
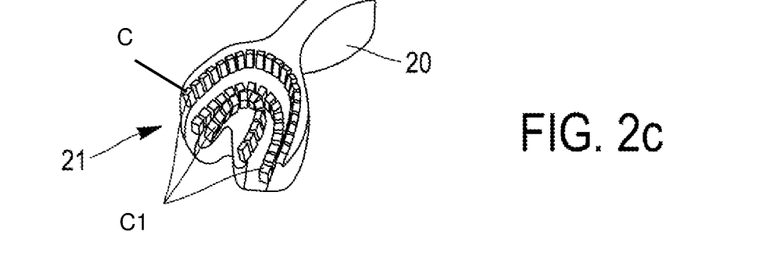

With reference to FIGS. 2a, 2b and 2c, one can see an impression tray 2 intended for obtaining the impression of a complete arch, the active part or dental arch part 21 being in the form of an arc of a circle. Such an impression tray 1 can be adapted to obtaining the impression of the upper arch and the lower arch.

Advantageously, the tray 2 can be, without limitation, made of a deformable material such as a thermoplastic or a flexible resin, and preferably not returning to the original shape after adaptation in the mouth of the patient.

In this case, the sensors, as well as the light projection means, are provided capable, during the deformation of adjustment to the patient's mouth, to move individually or in groups, so as not to move too far their known and calibrated spatial positions.

Figure 3A:
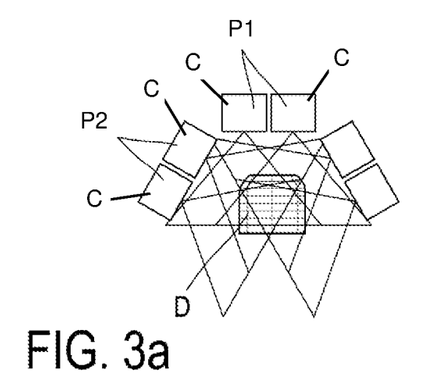
FIGS. 3a and 3b and 4 show schematic sectional views of an electronic impression tray according to the invention in different configurations of use.
Figure 3B:
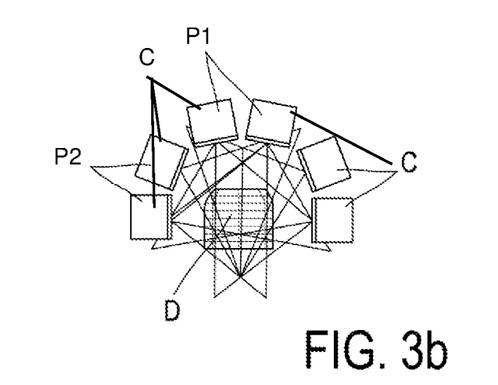

As shown in FIGS. 3a and 3b, the sensors can be, without limitation, in pairs (first pair P1, second pair P2) on the impression tray, not shown, and for example articulated to each other in each pair, to surround one or more several teeth D, optimally, while remaining in the same plane. At least two sensors of the plurality of sensors are a first pair P1 of sensors having a first initial position and first set position. At least another two sensors of the plurality of sensors are a second pair P2 of sensors having a second initial position and a second set position. FIGS. 3a and 3b show the first pair in the first set position being coplanar with the second pair in the second set position according to the deformable material and the hinged engagement of the elements so as to surround a tooth. The first pair is associated with the second pair so that an optical impression based on the tooth is formed by data from the first pair and the second pair.

Figure 4:
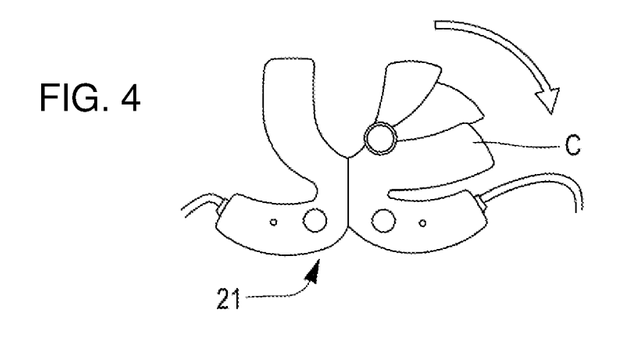

FIG. 4 thus shows two impression trays, one of which is shown in different positions, through a joint R for example, while the other remains stationary.

Figure 5:
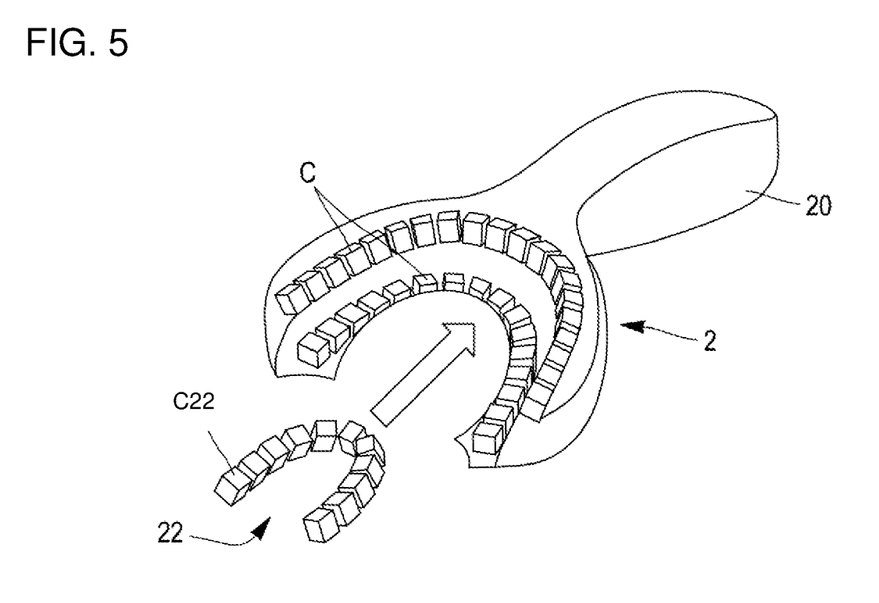
FIG. 5 shows a schematic perspective and exploded view of a particular embodiment of the electronic impression tray according to the invention.

Referring now to FIG. 5, we can see another possibility of modularity of an impression device 1 according to the invention, in particular, in that, a complete series of sensors C is removable, so as to be able or not to capture measures. At least one element of the plurality of elements is a separable element 22. At least one sensor of the plurality of sensors C is a separable sensor C22 on the separable element 22 as in FIGS. 5 and 13a. The separable sensor C22 being in wired or wireless communication with the electronic management system X of FIG. 20.

In this case, the active part or dental arch part 21 of the part or tray 2 has a complete arch and, without limitation, two parallel series in an arc of a circle of sensors C, and an element 22 is subject to the active part 21, this element 22 comprising a third series of sensors, thus increasing accuracy, resolution and/or measurement surface.

With reference to FIGS. 6a through 10b, one can see an impression tray 2 made of two joinable parts (first element 23, 25, 27 and second element 24, 26, 28), each corresponding, at the level of their active part, to a semi-arch, which it is possible to use separately, or together for obtaining an impression of an arch, the joining being carried out, without limitation, mechanically or magnetically. A magnetic means N as a magnet is shown in FIG. 6b. Note that it is possible to provide more than two assemblable parts.

Figures 6A, 6B:
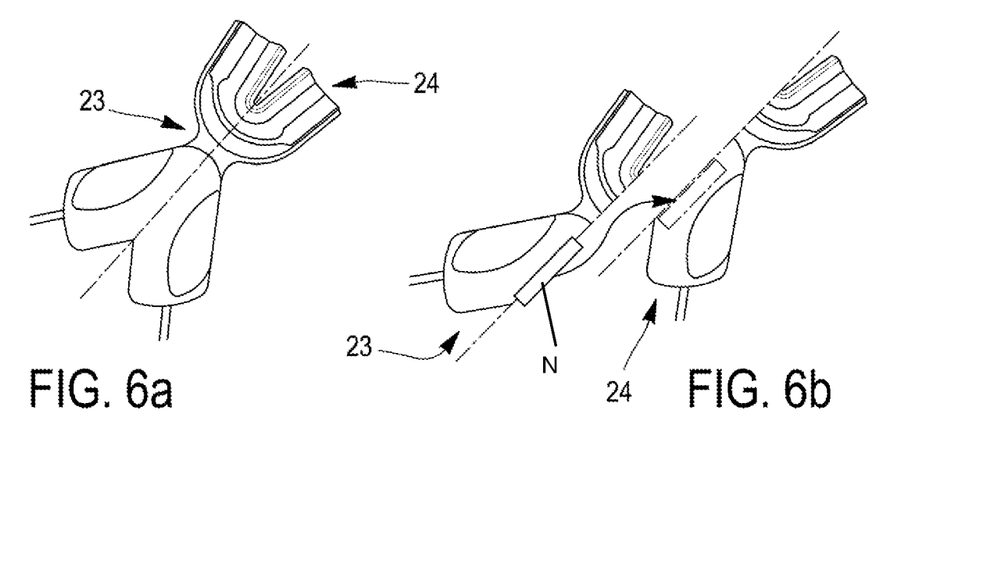
FIGS. 6a, 6b and 6c show schematic plan views of another embodiment of an electronic impression tray according to the invention in different configurations of use.
Figure 6C:
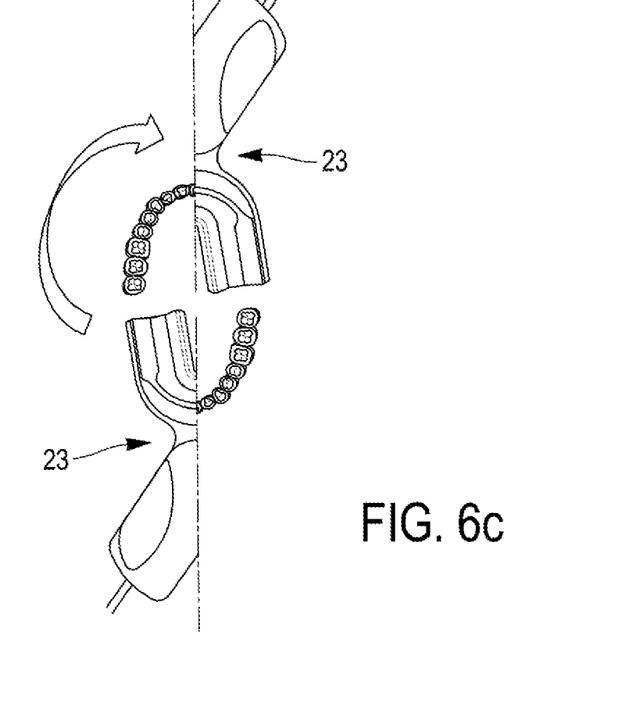
Figure 7A:
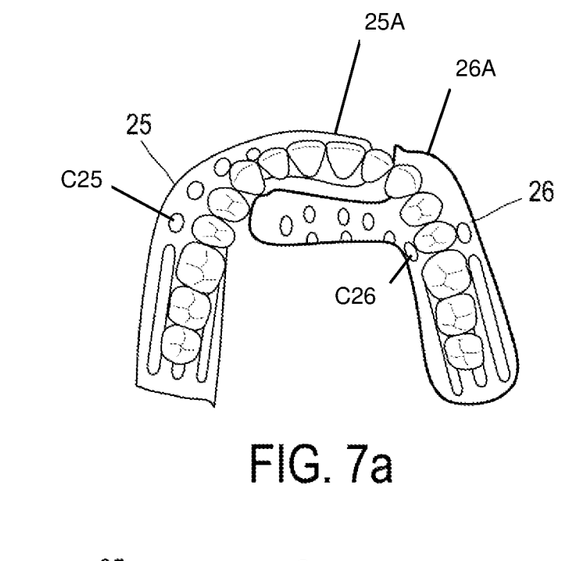
FIG. 7a shows a partial schematic plan view of an electronic impression tray according to the invention, according to a construction variant.
Figure 7B:
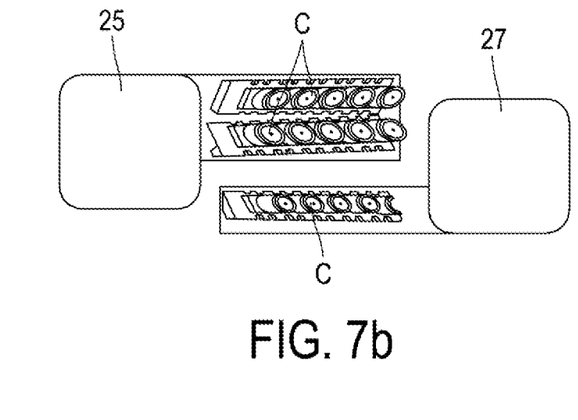
Figure 8A:
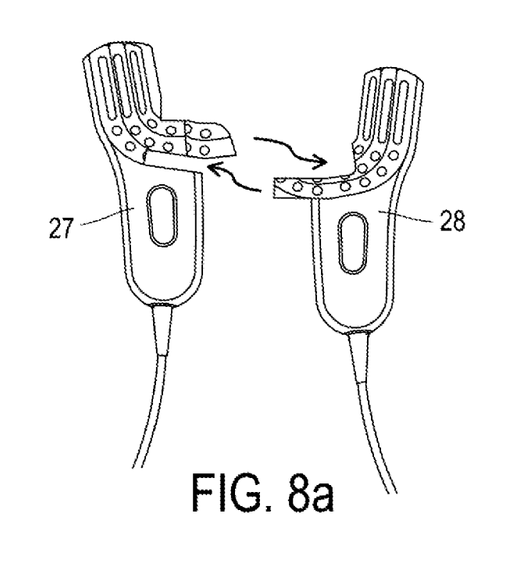
FIG. 8a shows a partial schematic plan view of an electronic impression tray according to the invention, according to a construction variant.
Figure 8B:
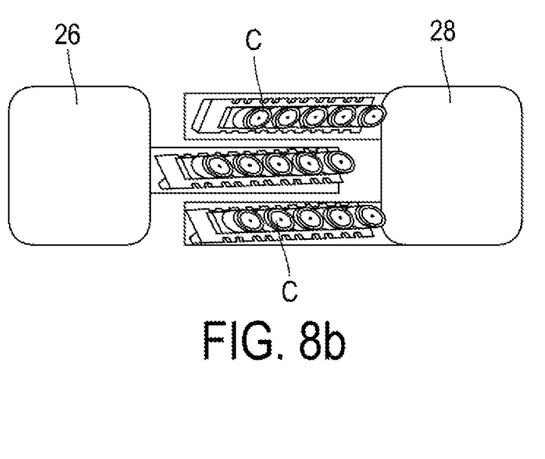

This configuration makes it possible to simplify and reduce the number of impression trays since the impression tray 23 of the upper left semi-arch corresponds to the impression tray of the lower right semi-arch, so that two impression trays 23 and 24 make it possible to make the four semi-arches but also, by bringing them together to make the two complete high and low arches.

With reference to FIGS. 7a and 7b, and 8a and 8b, it can be seen, according to other configurations, where the impression tray is also produced in two elements, 25 and 26, and 27 and 28, only after assembly of the two elements, C sensors of one of the elements, combine with C sensors of the other element, thus achieving the perfect fusion of the impression obtaining of the two semi-arches, because they base their measurements on part of the same object (the faces of one or more teeth) non-deformable and common to the different impression trays. For example, it may be for the sensors of one impression tray, the vestibular sides, while for the sensors of the other impression tray it will be the occlusal and lingual surfaces of the same teeth. The elements 23, 24, 25, 26, 27, 28 are interlockable. At least one element of the plurality of elements is a first element 23,25, and at least another element of the plurality of elements is a second element 24, 26. The first element is in interlockable engagement with the second element so as to form the dental arch part 21. The first element can have a first shape 25A, and the second element can have second shape 26A as in FIG. 7a. The first shape can be in interlocking engagement with the second shape. At least one sensor of the plurality of sensors is a first sensor C25 on the first element, and at least another sensor of the plurality of sensors is a second sensor C26 on the second element. The first sensor is associated with the second sensor so that an optical impression is formed by data from the first sensor and the second sensor.

Figure 9A:
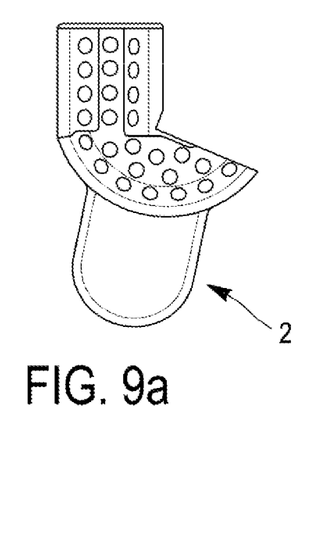
FIGS. 9a, 9b, 9c, 10a and 10b show schematic plan views of an electronic impression tray according to the invention, according to different alternative embodiments.
Figure 9B:
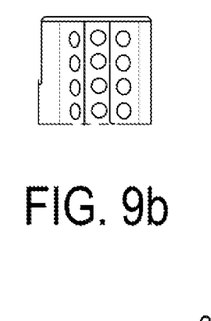
Figure 9C:
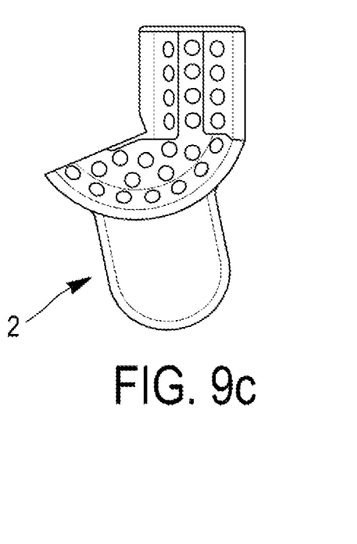
Figure 10A:
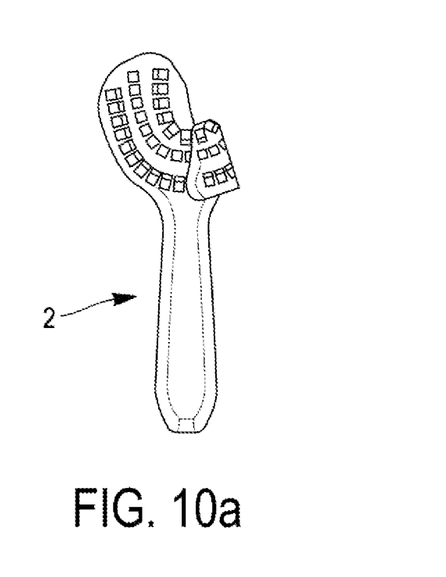
Figure 10B:
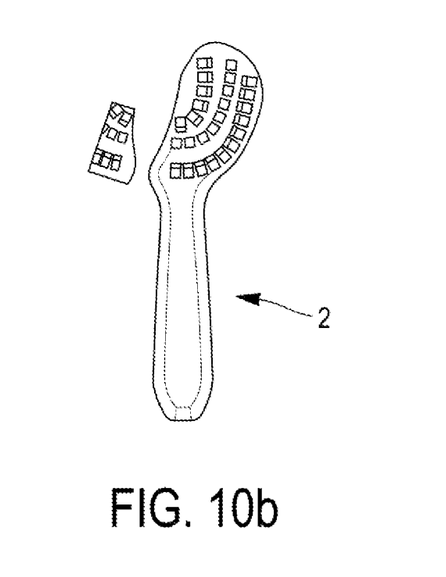

With reference to FIGS. 9a, 9b and 9c, and to FIGS. 10a and 10b, it can be seen that it is possible to provide elements which can be assembled on each other with prior removal of part of the other.

Figures 11A, 11B, 11C:
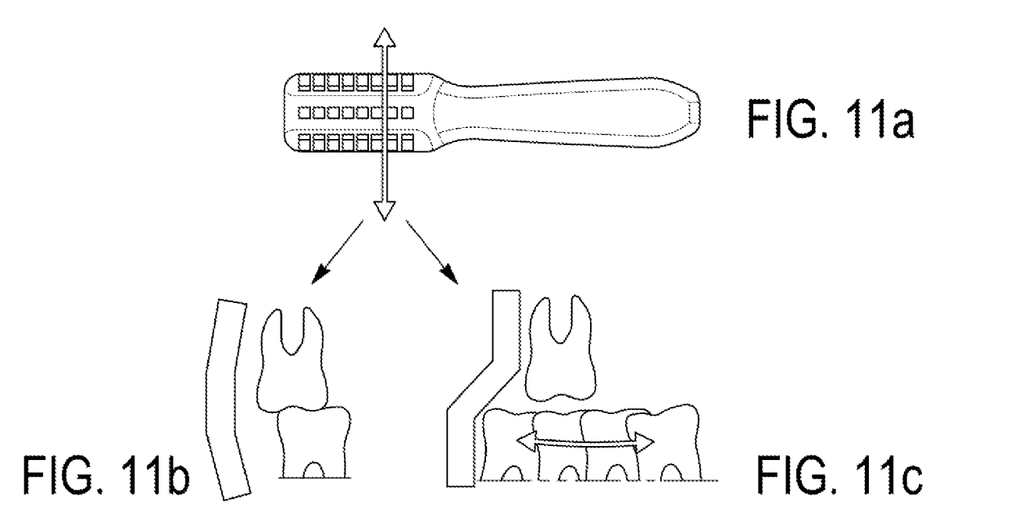
FIG. 11a shows a schematic plan view of another embodiment of an electronic impression tray according to the invention.
FIGS. 11b and 11c show the same impression tray of different configurations of use.

With reference to FIG. 11a, it can be seen that the active part 21 can be in the form of a plate having a particular shape, for example curved, adapted, possibly adaptable, to the particularities of the occlusion, so as to allow the shooting of the upper and lower arches in occlusion.

In FIG. 11b, the active part 21 is concave in shape opposite the teeth, in FIG. 11c it has a recess, in order to measure the disengagements, a fundamental value in occlusion movements and making it possible to define the dynamic modeling of the occlusal surface without resorting to complex systems of mechanical or electronic facial arcs.

It will be noted that by combining the optical sensors with an ultrasonic sensor system and/or an OCT (coherent tomographic optics) system, this allows a lateral view including the bone surface but also an under-enameled part of the teeth in order to limit exposures to X-rays during certain treatments such as that relating to the crown or the dental root.

Figure 12A:
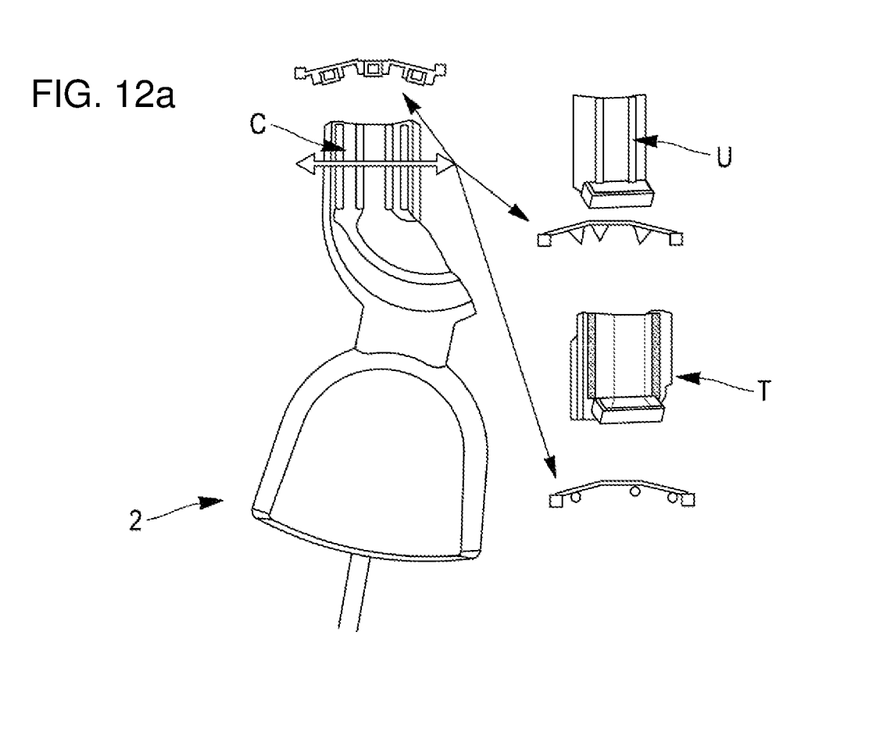
FIGS. 12a and 12b show schematic plan views of a variant of the electronic impression tray according to the invention.
Figure 12B:
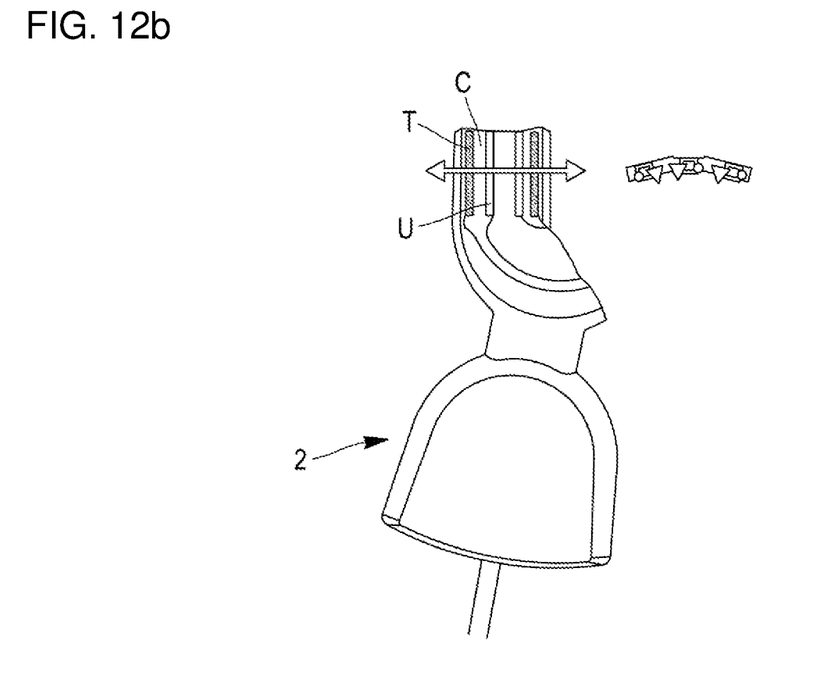

With reference to FIGS. 12a and 12b, one can see an impression tray device according to the invention, to the optical sensors C of which one can optionally add, sensors, an ultrasonic system U and/or an optical coherence tomographic (OCT) system T. These different systems can be removable, as shown in FIG. 12a, or permanently as shown in FIG. 12b, with the possibility of activating one and/or the other systems.

It is thus possible to choose the type of measurement that one wishes, with the advantage of being able to choose which measurement must be predominant.

Figure 13A:
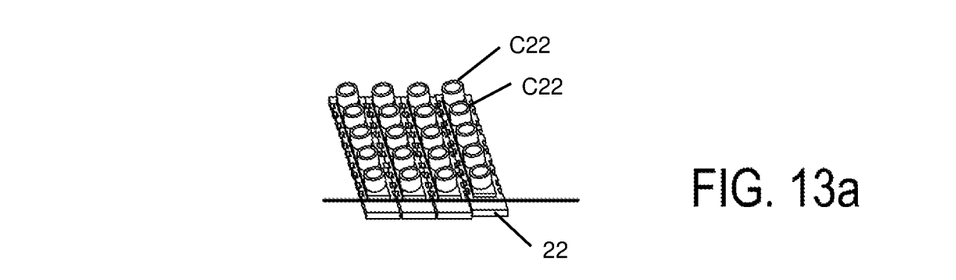
FIGS. 13a and 13b show schematic perspective views of parts of electronic impression tray according to the invention, in the context of a particular arrangement.
Figure 13B:
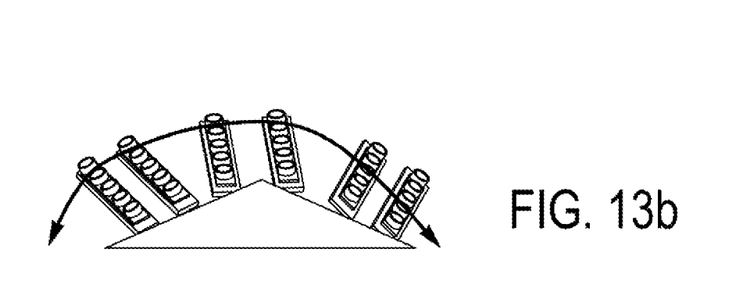

Referring now to FIGS. 13, we can see the presence of a calibration system allowing at any time to check the correct positioning of the sensors and sensors of the different analysis methods during the lifetime of the impression tray, especially for the control positioning of the optical parts C and T, but also to rebalance the position of the sensors and make the image processing system know the position of the sensors after deformation and adaptation in the patient's mouth by the clinician. This SC calibration system can have a flat or curved shape to be able to fit into the impression trays.

Figure 14A:
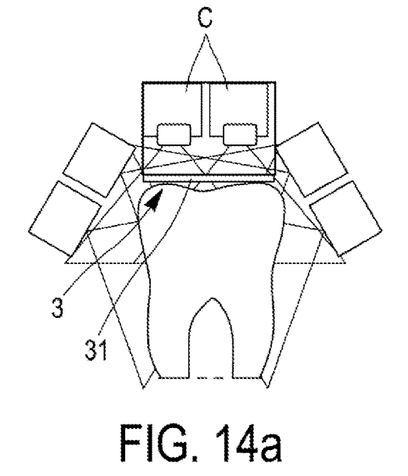
FIGS. 14a, 14b and 14c show schematic views of another embodiment of the electronic impression tray according to the invention.
Figure 14B:
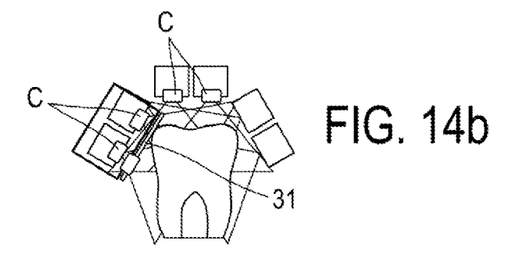

Referring now to FIG. 14, it can be seen that the device 1 further comprises a means 3 for depth adjustment of the sensors C, and it is planned to be able to rest or not on the teeth in order to ideally position the surfaces measured in the focal plane which is the high precision zone. This fulcrum bearing on the occlusal surface as in FIG. 14a, and/or on the vestibular or lingual surfaces, as in FIG. 14b, in the case of the occlusion sensor.

Figure 14C:
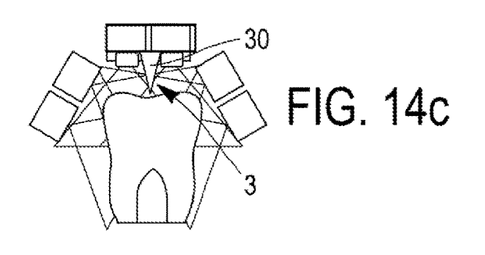

The means 3 for depth adjustment of the sensors C is comprised of a spacer 3, which can be a means 30, 31, 32 for taking support on teeth D can be achieved in several ways, through a spacer 3 such as a rod, a point, a ball or a blade 30, visible in FIG. 14c, or else a transparent wall 31, such as a window for example, visible in FIGS. 14a and 14b.

Figure 15:
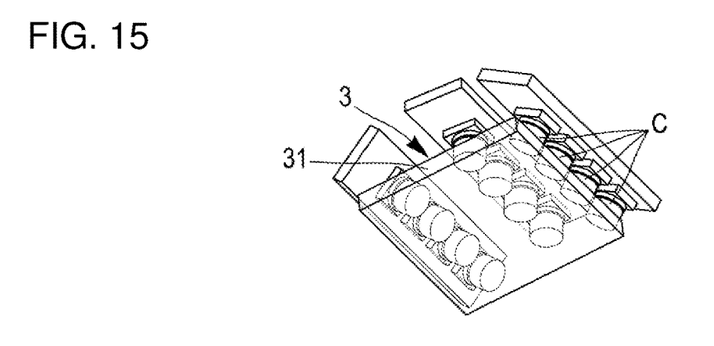
FIG. 15 shows a partial schematic perspective view of an element of the electronic impression tray of FIGS. 14a, 14b and 14c.

The transparent wall 31 can partially or completely cover the occlusal surface and/or the vestibular and/or lingual surfaces, as shown in FIG. 15.

Figure 16A:
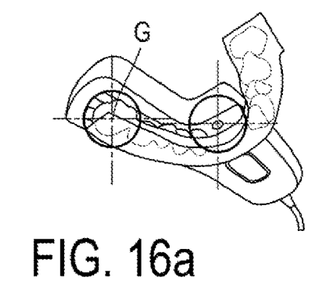
FIGS. 16a and 16b show partial schematic and perspective views of a variant of the embodiment of the optical impression tray of FIGS. 14a, 14b and 14c.
Figure 16B:
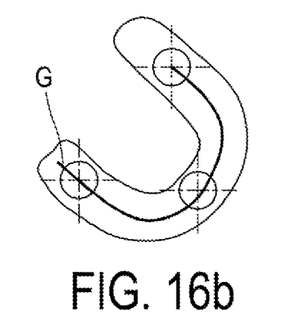

It will be noted that advantageously in the case of the use of transparent walls 31, the latter may bear engravings or targets G shown in FIGS. 16a and 16b, visible on the computer screen and allowing the impression tray to be positioned correctly in the desired area before reading but also to follow the progress of the impression obtaining during reading.

Figure 17A:
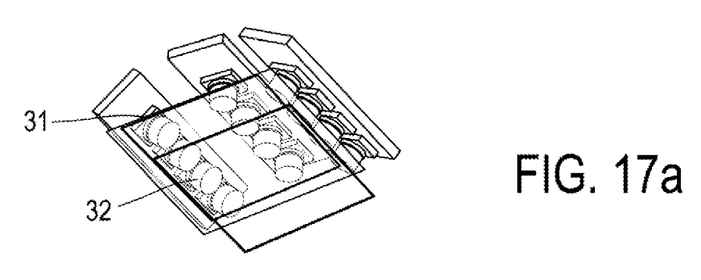
FIGS. 17a and 17b show partial schematic and perspective views of changes in the variant of the embodiment of the electronic impression tray of FIGS. 14a, 14b and 14c.
Figures 17B, 18:
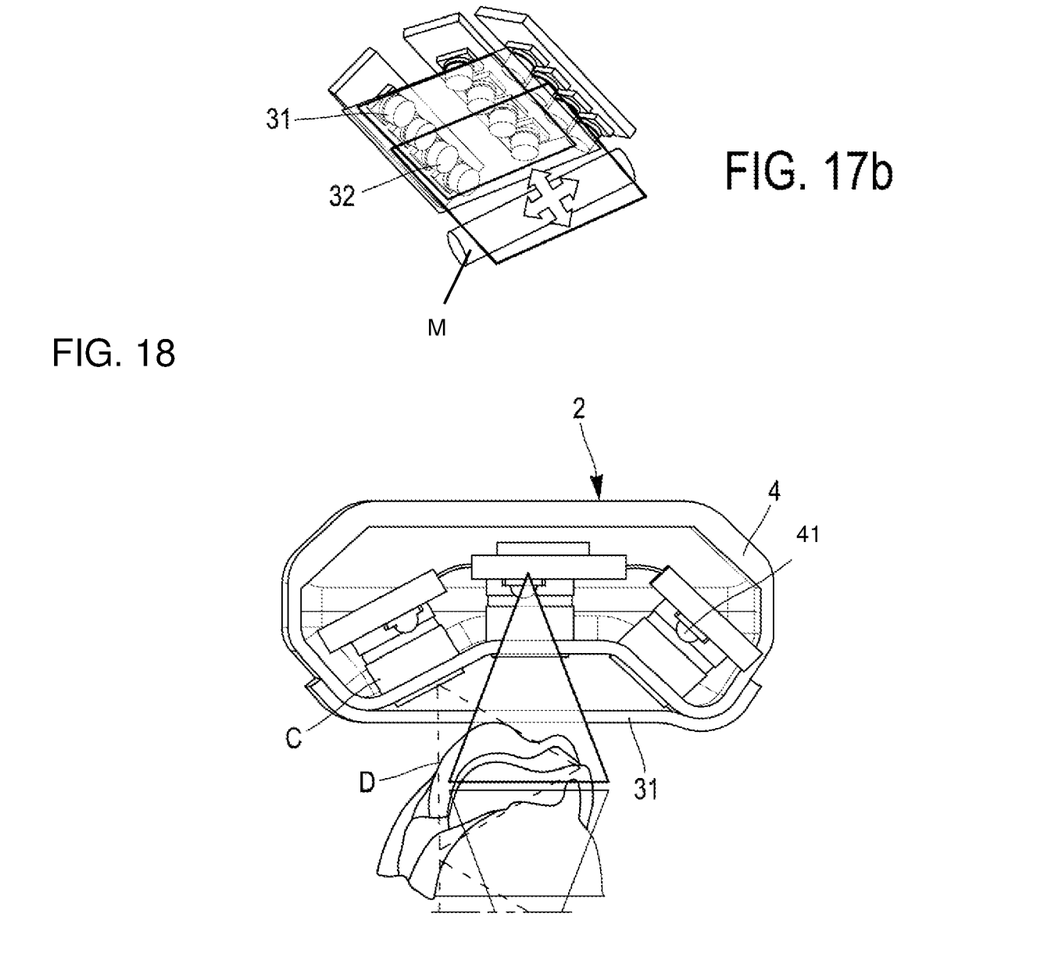
FIG. 18 shows a schematic sectional view of an electronic impression tray according to FIGS. 14a, 14b and 14c.

Also, advantageously, in certain cases of dynamic stereoscopic shooting, the calibration and the scaling require a slight movement at the start of the impression. To facilitate this movement, a second or additional transparent wall 32 is added, sliding on the first 31 within the limits of the accepted movement, as shown in FIGS. 17a and 17b, on the latter is shown a motor means M, such as a motor, which makes it possible to generate the friction movement.

The lighting system or means 4 for projecting passive light is preferably peripheral to the transparent wall or walls, 31, 32, in order to avoid reflections on the surfaces which may hinder good reading.

It is however possible to have, with reference to FIG. 18, a lighting system 4 or means 4 for projecting passive light, being comprised of LED 41 type lights, for example, behind the transparent wall or walls 31, the glass then being chosen as non-reflective as possible and the projection of the light will be made so that its optical axis and its reflection if it exists, arrive as little as possible in the measured area.

To avoid this type of reflection, the light projections leading to a light scan must always be distant and as little as possible step by step. And during scanning of flash, if the first flash is in the initial region of the impression tray, the 2nd is preferably in the opposite and therefore the end area and the 3rd flash in the top box and the 4th in the end area and so on.

Figure 19:
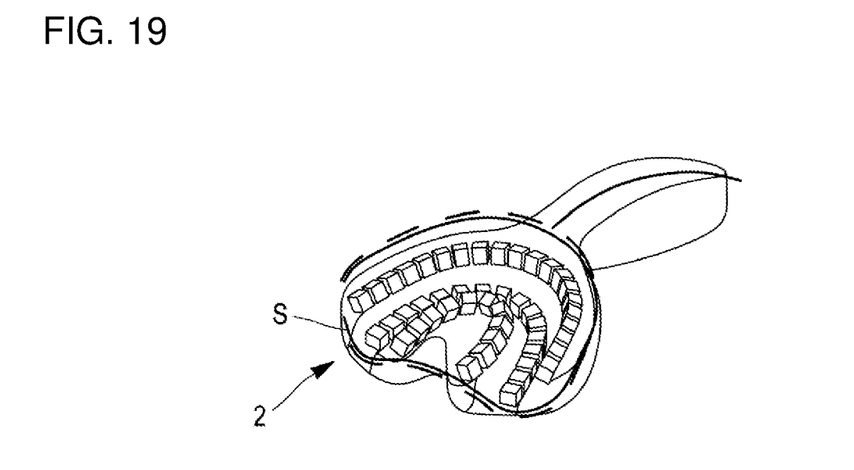
FIG. 19 shows a schematic perspective view of an electronic impression tray according to the invention, equipped with an option.
Figure 20:
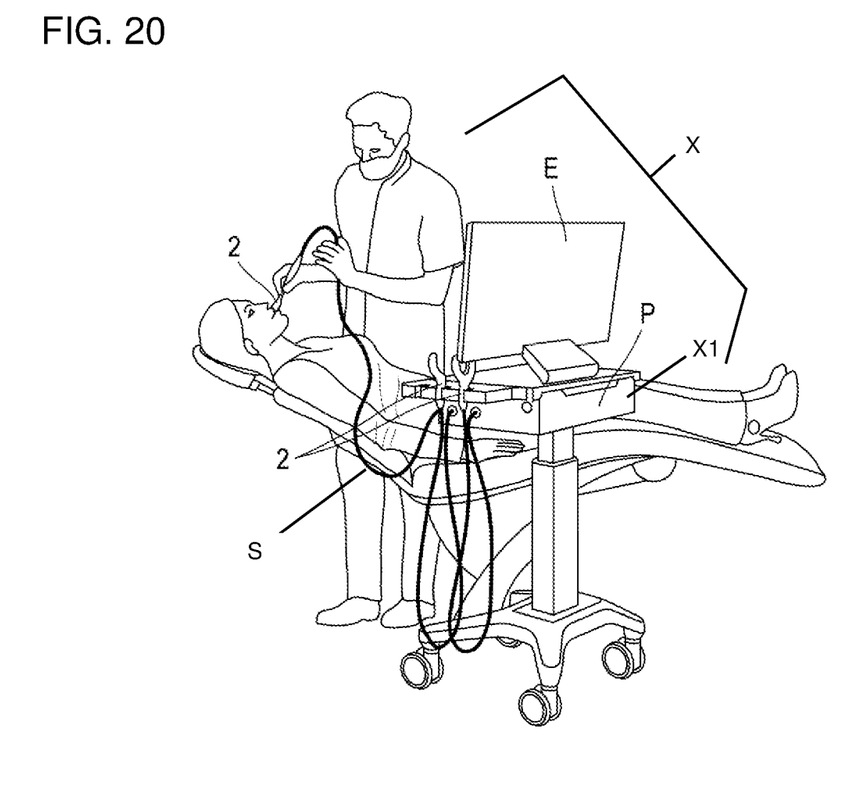
FIG. 20 shows a perspective view of an installation for obtaining electronic impressions as a whole at a practitioner's.

During the shooting, a salivary suction system and/or water and air projection (a fluid delivery and suction system S in fluid connection with the tray 2 in FIGS. 19 and 20) can be added to keep the area measured as clear as possible without saliva, blood or mist. These systems, the source of the fluids, suction or energy are always present on the dental unit will be adaptable on all or part (for example periphery) of the impression tray, as shown schematically in FIG. 19.

To complete the conditioning of the measured area, provision may be made for heating the impression tray and/or the transparent wall.

Referring now to FIG. 20 we can see an optical impression installation as a whole. This installation comprises a computer P as the central management unit X1 for processing the captured images equipped with a display screen E. It further comprises one or more impression trays according to the invention, in this case several, are connected by wire, knowing that it is also possible to have a wireless connection of the type via WIFI, Bluetooth or any other network.

The triggering of the shooting can be carried out by button, voice or using a pedal by the practitioner D or by a button for the patient P.

We claim:

1. An electronic impression device 1, comprising:
   an optical measurement sensor system, being comprised of a plurality of sensors;
   an electronic management system being in communication with said sensors and being comprised of a central management unit so as to collect, store, and order data obtained by said sensors; and
   a tray having a dental arch and being comprised of a plurality of elements in hinged engagement with each other so as to reversibly form said dental arch part, said dental arch part being adjustable according to said elements in said hinged engagement,
   wherein said sensors are distributed over said dental arch part of said tray,
   wherein said tray is comprised of a deformable material,
   wherein at least two sensors of said plurality of sensors are a first pair of sensors having a first initial position and first set position,
   wherein at least another two sensors of said plurality of sensors are a second pair of sensors having a second initial position and a second set position,
   wherein said first pair in said first set position is coplanar with said second pair in said second set position according to said deformable material and said hinged engagement of said elements so as to surround a tooth, and
   wherein said first pair is associated with said second pair so that an optical impression based on said tooth is formed by data from said first pair and said second pair.

2. The electronic impression device, according to claim 1, wherein said sensors are comprised of at least one of a group consisting of: ultrasonic sensors and optical coherence tomographic sensors.

3. The electronic impression device, according to claim 1, wherein said tray is comprised of a deformable material, said deformable material being one of a group consisting of a thermoplastic resin and a flexible resin, so as to have a permanently moldable shape.

4. The electronic impression device, according to claim 1, wherein said elements are interlockable,
   wherein at least one element of said plurality of elements is a first element,
   wherein at least another element of said plurality of elements is a second element,
   wherein said first element is in interlockable engagement with said second element so as to form said dental arch part,
   wherein at least one sensor of said plurality of sensors is a first sensor on said first element,
   wherein at least another sensor of said plurality of sensors is a second sensor on said second element, and
   wherein said first sensor is associated with said second sensor so that an optical impression is formed by data from said first sensor and said second sensor.

5. The electronic impression device, according to claim 4, wherein said first element has a first shape,
   wherein said second element has second shape, and
   wherein said first shape is in interlocking engagement with said second shape.

6. The electronic impression device, according to claim 1, further comprising:
   means for depth adjustment of said sensors,
   wherein said means for depth adjustment is comprised of means for taking support on teeth.

7. The electronic impression device, according to claim 6, wherein the means for taking support on teeth is comprised of a blade projecting between adjacent sensors.

8. The electronic impression device, according to claim 6, wherein the means for taking support on teeth is comprised of a transparent wall, extending above a respective sensor.

9. The electronic impression device, according to claim 8, wherein said transparent wall is comprised of marks.

10. The electronic impression device, according to claim 8, wherein said transparent wall is deformable.

11. The electronic impression device, according to claim 1, further comprising:
    a fluid delivery and suction system in fluid connection with said tray.

12. The electronic impression device, according to claim 1, further comprising:
    means for projecting passive light.

13. The electronic impression device, according to claim 1, wherein said tray is black in color.

14. The electronic impression device, according to claim 1, wherein at least one element of said plurality of elements is a separable element,
    wherein at least one sensor of said plurality of sensors is a separable sensor on said separable element, said separable sensor being in communication with said electronic management system.

15. An electronic impression device, comprising:
    an optical measurement sensor system being comprised of a plurality of sensors;
    an electronic management system being in communication with said sensors and being comprised of a central management unit so as to collect, store, and order data obtained by said sensors; and
    a tray having a dental arch and being comprised of a plurality of elements in hinged engagement with each other so as to form said dental arch part, said dental arch part being adjustable according to said elements in said hinged engagement,
    wherein said sensors are distributed over said dental arch part of said tray,
    wherein said elements are interlockable,
    wherein at least one element of said plurality of elements is a first element,
    wherein at least another element of said plurality of elements is a second element,
    wherein said first element is in interlockable engagement with said second element so as to form said dental arch part,
    wherein at least one sensor of said plurality of sensors is a first sensor on said first element,
    wherein at least another sensor of said plurality of sensors is a second sensor on said second element,
    wherein said first sensor is associated with said second sensor so that an optical impression is formed by data from said first sensor and said second sensor, and
    wherein said first element and said second element are magnetically interlockable.

16. An electronic impression device, comprising:
an optical measurement sensor system being comprised of a plurality of sensors;
an electronic management system being in communication with said sensors and being comprised of a central management unit so as to collect, store, and order data obtained by said sensors;
a tray having a dental arch and being comprised of a plurality of elements in hinged engagement with each other so as to form said dental arch part, said dental arch part being adjustable according to said elements in said hinged engagement,
wherein said sensors are distributed over said dental arch part of said tray; and
means for depth adjustment of said sensors,
wherein said means for depth adjustment is comprised of means for taking support on teeth, and
wherein the means for taking support on teeth is comprised of:
a transparent wall, extending above a respective sensor;
an additional transparent wall in sliding engagement said transparent wall; and
a motor means for a friction movement between said transparent wall and said additional transparent wall.

* * * * *